United States Patent
Zekavat

(10) Patent No.: US 7,489,935 B2
(45) Date of Patent: Feb. 10, 2009

(54) WIRELESS LOCAL POSITIONING SYSTEM

(75) Inventor: Seyed A. Zekavat, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 299 days.

(21) Appl. No.: 10/848,749

(22) Filed: May 19, 2004

(65) Prior Publication Data

US 2004/0235497 A1  Nov. 25, 2004

Related U.S. Application Data

(60) Provisional application No. 60/471,553, filed on May 19, 2003, provisional application No. 60/511,443, filed on Oct. 15, 2003.

(51) Int. Cl.
*H04B 1/02* (2006.01)

(52) U.S. Cl. ............... 455/456.1; 455/456.2; 455/456.5

(58) Field of Classification Search .............. 455/456.1, 455/456.2, 456.3, 456.5, 41.1, 517, 504, 455/506; 342/374, 457
See application file for complete search history.

(56) References Cited

U.S. PATENT DOCUMENTS

| | | | |
|---|---|---|---|
| 3,739,329 A | 6/1973 | Lester | |
| 3,805,265 A | 4/1974 | Lester | |
| 4,347,501 A | 8/1982 | Akerberg | |
| 4,649,385 A | 3/1987 | Aires et al. | |
| 4,918,432 A | 4/1990 | Pauley et al. | |
| 4,937,795 A | 6/1990 | Motegi et al. | |
| 5,062,151 A | 10/1991 | Shipley | |
| 5,068,654 A | 11/1991 | Husher | |
| 5,070,334 A | 12/1991 | Commissaire et al. | |
| 5,198,800 A | 3/1993 | Tozawa et al. | |
| 5,214,409 A | 5/1993 | Beigel | |
| 5,552,772 A | 9/1996 | Janky et al. | |
| 5,554,982 A | 9/1996 | Shirkey et al. | |
| 5,574,469 A | 11/1996 | Hsu | |
| 5,589,827 A | 12/1996 | Scurati | |
| 5,629,689 A | 5/1997 | Curwood | |
| 5,689,238 A | 11/1997 | Cannon, Jr. et al. | |
| 5,790,076 A | 8/1998 | Sypniewski | |
| 5,796,362 A | 8/1998 | Ayasli et al. | |
| 5,870,215 A | 2/1999 | Milano et al. | |

(Continued)

OTHER PUBLICATIONS

United States Statutory Invention Registration No. H1606, Glenovatch et al., Nov. 5, 1996.

(Continued)

*Primary Examiner*—Sam Bhattacharya
(74) *Attorney, Agent, or Firm*—Michael Best & Friedrich LLP

(57) ABSTRACT

A method of locating mobiles via a dynamic base station. The method includes transmitting a first wireless signal from the dynamic base station at a first time, and receiving the first wireless signal at the mobile. The method also includes transmitting a second wireless signal from the mobile in response to receiving the first wireless signal, and receiving the second wireless signal at the dynamic base station at a second time. The method also includes determining a time difference between the first time and the second time, determining an angle of arrival of the second wireless signal, and locating the mobile based on the angle of arrival and the time difference.

26 Claims, 7 Drawing Sheets

U.S. PATENT DOCUMENTS

| | | | |
|---|---|---|---|
| 5,905,433 | A | 5/1999 | Wortham |
| 5,917,425 | A | 6/1999 | Crimmins et al. |
| 5,920,287 | A | 7/1999 | Belcher et al. |
| 5,986,562 | A | 11/1999 | Nikolich |
| 6,025,799 | A * | 2/2000 | Ho et al. ............... 342/374 |
| 6,054,951 | A | 4/2000 | Sypniewski |
| RE36,791 | E | 7/2000 | Heller |
| 6,121,544 | A | 9/2000 | Petsinger |
| 6,141,335 | A | 10/2000 | Kuwahara et al. |
| 6,141,738 | A | 10/2000 | Munter et al. |
| 6,160,493 | A | 12/2000 | Smith |
| 6,167,240 | A * | 12/2000 | Carlsson et al. ......... 455/67.13 |
| 6,222,452 | B1 | 4/2001 | Ahlstrom et al. |
| 6,229,445 | B1 | 5/2001 | Wack |
| 6,232,887 | B1 | 5/2001 | Carson |
| 6,249,252 | B1 * | 6/2001 | Dupray ................ 342/450 |
| 6,295,284 | B1 * | 9/2001 | Maggenti ................ 370/328 |
| 6,407,703 | B1 | 6/2002 | Minter et al. |
| 6,420,996 | B1 | 7/2002 | Stopczynski et al. |
| 6,693,544 | B1 | 2/2004 | Hebbecker |
| 6,714,120 | B2 | 3/2004 | Blama et al. |
| 6,934,546 | B1 * | 8/2005 | Corbett et al. ............ 455/441 |
| 2002/0094824 | A1 | 7/2002 | Kennedy, Jr. et al. |
| 2002/0143588 | A1 | 10/2002 | Ishigami et al. |
| 2002/0167444 | A1 * | 11/2002 | Lee ..................... 342/387 |
| 2003/0001778 | A1 | 1/2003 | Benner et al. |
| 2003/0006878 | A1 | 1/2003 | Chung |
| 2003/0122685 | A1 | 7/2003 | Tuttle |
| 2003/0147651 | A1 | 8/2003 | Roes et al. |
| 2003/0149530 | A1 | 8/2003 | Stopczynski |
| 2003/0151524 | A1 | 8/2003 | Clark |
| 2003/0173408 | A1 | 9/2003 | Mosher, Jr. et al. |
| 2004/0049343 | A1 | 3/2004 | Yamadaji et al. |
| 2004/0209648 | A1 * | 10/2004 | Chen ..................... 455/558 |
| 2004/0266457 | A1 * | 12/2004 | Dupray ................ 455/456.5 |

OTHER PUBLICATIONS

Paul Sharke, "Smart Cars," Mechanical Engineering, Mar. 2003, pp. 50-52.

Hossein Jula, Elias B. Kosmatopoulos, and Petros A. Ioannou, "Collision Avoidance Analysis for Lane Changing and Merging," IEEE Transactions on Vehicular Technology, Nov. 2000, pp. 2295-2308, vol. 49, No. 6.

Alexander Kanaris, Elias B. Kosmatopoulos, and Petros A. Ioannou, "Strategies and Spacing Requirements for Lane Changing and Merging in Automated Highway Systems," IEEE Transactions on Vehicular Technology, Nov. 2001, pp. 1568-1581, vol. 50, No. 6.

Keiji Saneyoshi, "Drive Assist System Using Stereo Image Recognition," IEEE Intelligent Vehicle Symp., pp. 230-235, Sep. 19-20, 1996.

"Car, Open Your Eyes," Hightech Report, Feb . 2002, pp. 24-27.

Hermann Rohling, Marc-Michael Meinecke, Michael Klotz, and Urs Lübbert, "Research Activities in Automotive Radar," IEEE MSMW 2001 Symposium Proceedings, Jun. 4-9, 2001, pp. 48-51, Kharkov, Ukraine.

Manabu Sekine, Tetsuo Senoo, Ikuhiro Morita, and Hiroshi Endo, "Design Method for an Automotive Laser Radar System and Future Prospects for Laser Radar," Intelligent Vehicles Symposium '92, pp. 120-125, Jun. 29-Jul. 1, 1992.

Stephen P. Reichhart, Bruce Youmans, and Roger Dygert, "The Software Radio Development System," IEEE Personal Communications, Aug. 1999, pp. 20-24.

Lal. C. Godara, "Application of Antenna Arrays to Mobile Communications, Part II: Beam-Forming and Direction-of-Arrival Considerations," Proceedings of the IEEE, Aug. 1997, pp. 1195-1245, vol. 85, No. 8.

Merrill I. Skolnik, "Introduction to Radar Systems," 1962, pp. 2-3, Second Edition, McGraw-Hill, Inc., Singapore.

Imad Elhajj, Jindong Tan, Yu Sun, and Ning Xi, "Supermedia Enhanced Human/Machine Cooperative Control of Robot Formations," Proceedings of the IEEE International Conference on Intelligent Robots and Systems EPFL, Oct. 2002, Lausanne, Switzerland, pp. 1296-1301.

Seyed A. Zekavat, "Mobile Base Station (MBS) Wireless with Applications in Vehicle Early Warning Systems," Proceedings the University of Texas at Austin 2003 Wireless Networking Symposium, Oct. 22-24, 2003.

Seyed A. Zekavat, "A Novel Application for Wireless Communications in Vehicle Early Warning," IEEE Consumer Communications and Networking 2004, Las Vegas, NV, Jan. 5-8, 2004.

Seyed A. Zekavat, Hui Tong, and Jindong Tan, "A Novel Wireless Local Positioning System for Airport (Indoor) Security," Proceedings of SPIE Conference on Defense and Security 2004, Apr. 12-16, 2004, Orlando FL.

Seyed A. Zekavat, and Hui Tong, "Wireless Local Positioning System via DS-CDMA and Beamforming: A Perturbation Analysis," Submitted to IEEE Globecom04, Nov. 29-Dec. 3, 2004 , Dallas, TX.

Commissioner Michael J. Copps, and Commissioner Kevin J. Martin, Revision of Part 15 of the Commission's Rules Regarding Ultra-Wideband Transmission Systems, "First Report and Order," pp. 2-118.

Seyed A. Zekavat, Jingdong Tan, and Hui Tong, "A Mobile Positioning System for Unmanned Vehicle Cooperation," SPIE symposium on Defense and Security, 2004.

* cited by examiner

WIRELESS LOCAL POSITIONING SYSTEM

RELATED APPLICATION

This application claims the benefit of provisional application No. 60/471,553 filed on May 19, 2003, and provisional application No. 60/511,443 filed on Oct. 15, 2003.

BACKGROUND OF THE INVENTION

The present invention relates to communication systems, and more particularly to communication systems configured to locate an object.

SUMMARY OF THE INVENTION

In one form, the invention provides a method of locating mobiles via a dynamic base station. The method includes transmitting a first wireless signal from the dynamic base station at a first time, and receiving the first wireless signal at the mobile. The method also includes transmitting a second wireless signal from the mobile in response to receiving the first wireless signal, and receiving the second wireless signal at the dynamic base station at a second time. The method also includes determining a time difference between the first time and the second time, determining an angle of arrival of the second wireless signal, and locating the mobile based on the angle of arrival and the time difference.

In another form, the invention provides a method of locating a target from a base. The base has an omni-directional or directional means for transmitting a base wireless signal. The base also includes a directional means such as an antenna array for receiving an target signal and capable of determining a reception angle of the target signal. The target has a transponding means capable of receiving an activating signal and responding with a target signal. The method includes directionally transmitting the activating signal from the omni-directional means at a first time, activating the transponding means at the target in response to receiving the activating signal, and transmitting a target signal from the transponding means after the transponding means has been activated. The method also includes receiving the target wireless signal at the antenna array means at a second time, determining from the antenna array means the reception angle of the target signal, comparing the first time with the second time to obtain a signal travel time, and locating the target based on the signal travel time and the reception angle of the target signal.

In another form, the invention provides a method of locating a selected one of a plurality of mobiles from a dynamic base. The method includes transmitting a wireless activating signal from the dynamic base at a first time, activating with the wireless activating signal a transponder on each of the plurality of mobiles, in response to activating each transponder, and transmitting with each transponder a wireless signal having a unique mobile signature. The method also includes receiving the wireless signals at the dynamic base at a plurality of arrival times, comparing the unique mobile signature of each wireless signal with a known unique mobile signature of the selected mobile, and identifying the wireless signal of the selected mobile based upon a match between the known unique mobile signal and the unique mobile signal of one of the wireless signals. Furthermore, the method includes determining a reception angle of the wireless signal of the selected mobile, comparing the first time with the arrival time of the wireless signal of the selected mobile to obtain a time difference, and locating the selected mobile based on the time difference and the reception angle.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Figure 1:
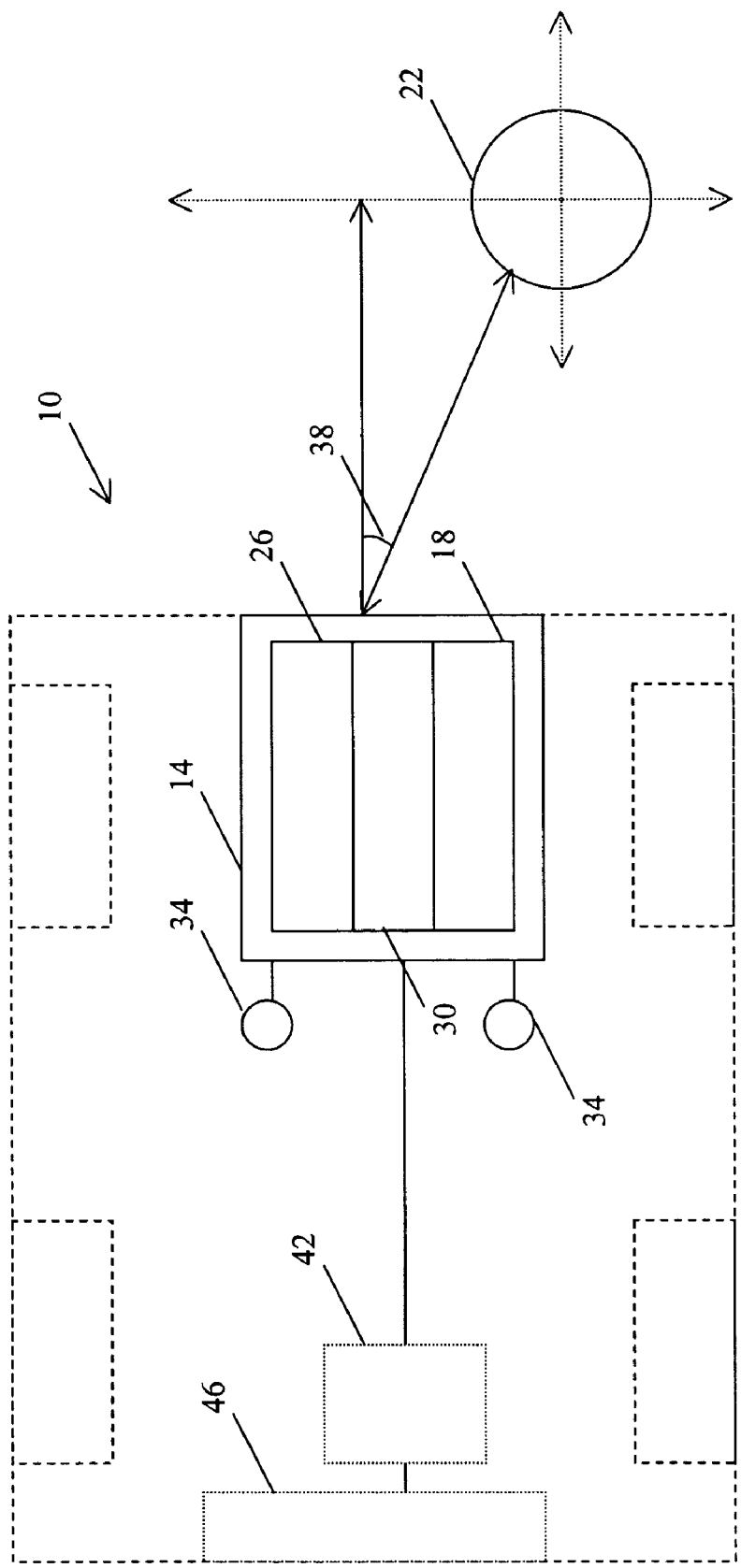
FIG. 1 shows an early warning system according to the invention.

FIG. 1 illustrates a vehicle 10 equipped with a vehicle intensified early warning ("VIEW") system 14 according to an embodiment of the invention. The system 14 deploys a secondary surveillance radar system, a secondary radar system, or a dynamic base 18 in the vehicle 10. The radar or the dynamic base system 18 is configured to actively detect for specifically coded transponders or targets such as target 22. A typical target can be a pedestrian carrying a wireless handheld device that includes a specific transponder. For example, a wireless handheld device can be a cell phone, a personal digital assistant ("PDA"), a smart badge worn by children, a specially coded key chain, an animal collar equipped with a transponder, and the like.

Particularly, the radar or the dynamic base system 18 transmits energy bursts consisting of a code specially designed for the vehicle early warning system 14. A transponder of the target 22 detects the code transmitted by a wireless system and automatically responds to the received radar signal. Here, the target announces its presence in a space under investigation or a coverage area by the radar or the dynamic base system 18 by sending a burst of energy containing a code (the target's identifier code, e.g., long codes) back to the radar or the dynamic base system 18. The VIEW system 14 also includes other elements such as an antenna 26, a processor 30, and a plurality of sensors 34. The radar or the dynamic base system 18 is configured to be actively sending out detecting signal repetitively. Once the target 22 (that is equipped with a transponder and a unique transponder code) approaching a predetermined distance within a zone of the radar or the dynamic base system 18, the transponder reacts to the sent signal by transmitting the unique transponder code back to the vehicle. The VIEW system 14 and the antenna 26 are also configured to determine the direction in which the target 22 relative to the vehicle 10 with a plurality of signal arrival angles 38, detailed hereinafter. Similarly, a central processing unit 42 can also be coupled to receive the processed data from the system 14, and to combine the data with the output of a vision warning system 46. The central processing unit 42 will determine if any action is necessary.

Hence, each transponder is equipped with a specific transponder code unique for that transponder thereby differentiating one transponder from another. That is, if more than one target is available in the area under investigation, the individual targets can be recognized by the radar system 18. In this way, the early warning system does not need to perform a complex statistical signal processing to detect or recognize the targets in a critical risk of impact and to generate triggering signals. The system 14 equipped with the unique transponder code results in a very high probability of detection (almost 1 in a scale from 0 to 1, with 1 being the highest probability), and a very low probability of false alarm (almost zero in a scale from 0 to 1, with 0 being the lowest probability).

Figure 2:
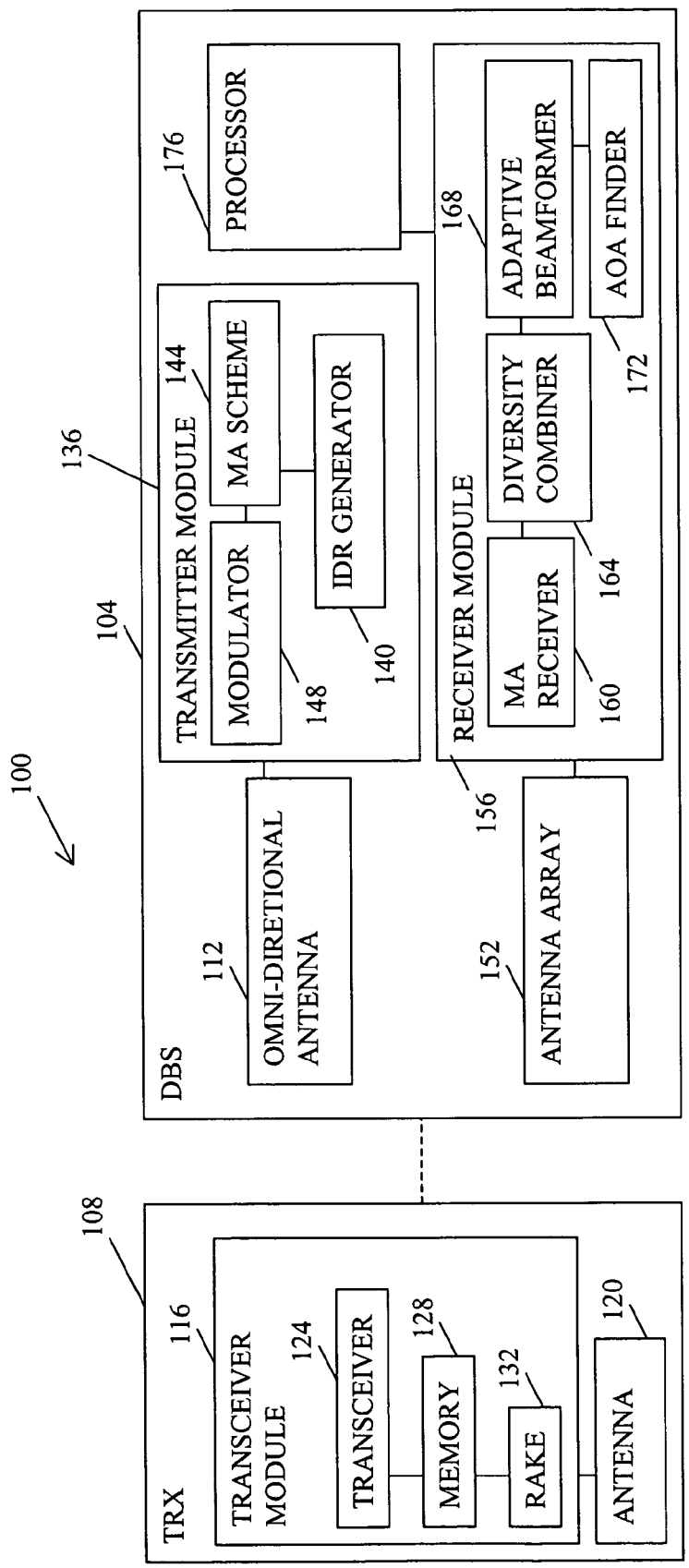
FIG. 2 shows a block diagram of a wireless local positioning system ("WLPS") embodying the invention.

FIG. 2 shows a wireless local positioning system ("WLPS") 100 block diagram embodying the invention. The WLPS 100 includes two main components, a dynamic base station ("DBS") 104 and a transponder ("TRX") 108. The DBS 104, which acts as an dynamic base, is typically deployed in a mobile object such as vehicle, robot, and handheld device such as pocket computer, personal digital assistant, cell phone, and the like. Similarly, the TRX 108 is typically installed in wireless mobile objects or targets such as handheld devices, robots and vehicles, and acts as an active target. In this regard, the vehicle 10 and target 22 described above with respect to FIG. 1 are examples of a DBS 104 and a TRX 108, respectively. However, there are some applications in which one or both of the DBS 104 and the TRX 108 may be stationary rather than mobile, or may sometimes move and sometimes stay still. The DBS 104 transmits periodic ID request ("IDR") signals into a coverage area via an omni-directional antenna 112, when required. Although an omni-directional antenna 112 is shown in FIG. 2, other directional antenna can also be used in conjunction with the transmitter module 136.

Each TRX 108 is assigned a unique identification ("ID") code. Each TRX 108 also generally includes a simple transceiver that uses a unique signaling transmission and receiving technique, detailed hereinafter. Once the IDR signals generated by the DBS 104 have been detected by a TRX antenna inside the coverage area, the TRX 104 will actively respond to the detected IDR signals. Typically, active responses by the TRX 104 result in a higher probability of detection of the uplink signals when compared with signals generated by passive targets. The WLPS 100 also requires minimum or no infrastructure operation via the DBS 104 as opposed to a static base station which typically requires communication infrastructures to operate.

Generally, the WLPS 100 is configured to remotely position a TRX 104 within in a line-of-sight ("LOS") of the WLPS 100. In many applications, however, a high coverage area beyond the LOS is required. A high coverage area is created via multi-hop localization techniques. Generally, when an intended TRX is not within a LOS of a searching DBS 104, searching signals from the searching DBS 108 will hop on a second DBS 104'. If the second DBS 104' is within the LOS of the intended TRX 108, the searching DBS 104 is considered an indirect DBS ("IDBS"), whereas the second DBS 104' is considered a direct DBS ("DDBS"). As a result, the IDBS locates a non-LOS TRX via the DDBS that is within a LOS of the intended TRX 108. In this case, the IDBS needs to find a relative location of the DDBS.

Specifically, the TRX 108 includes a transceiver module 116 and an omni-directional antenna 120. The transceiver module 116 typically includes a multiple access transceiver 124 such as a code division multiple access ("CDMA") transceiver, or an ultra-wide band ("UWB") transceiver, and a memory 128. Although the memory 128 is shown being external to the transceiver 124, the memory 128 can also be internal to the transceiver 124 depending on design. In other embodiments, the transceiver module 116 may also include a standard rake receiver 132, and a CDMA transmitter. The TRX 108 transmits a unique ID code as soon as the TRX 108 detects the IDR signals sent by the DBS 104. The unique ID code is assigned permanently at installation, or can be assigned by the DBS 104 depending on application.

Figure 3:
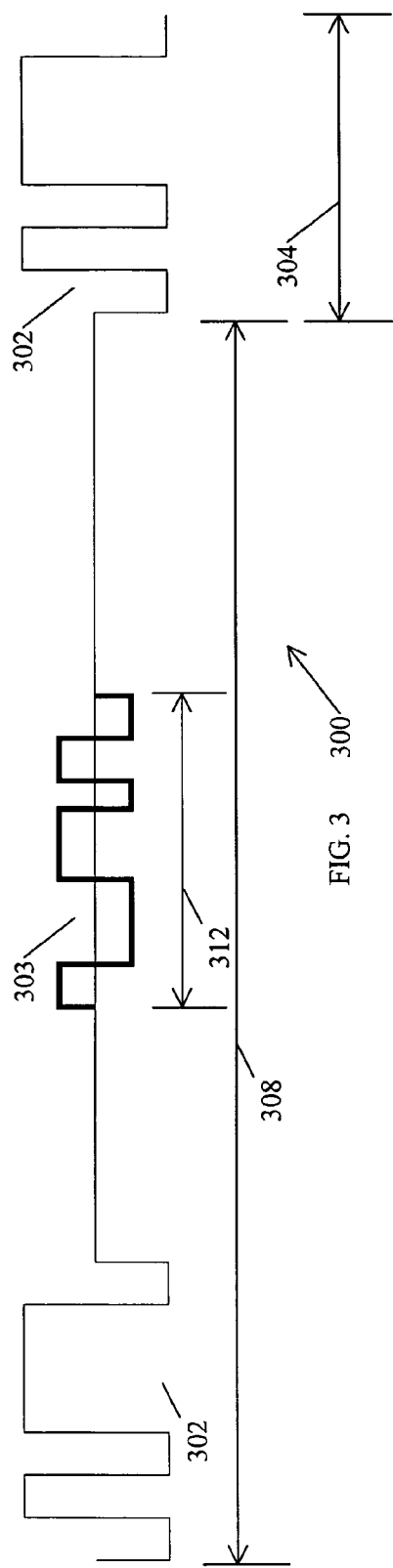
FIG. 3 shows a representation of transmission and reception in the WLPS.

The DBS 104, as shown in FIG. 2, includes a DBS transmitter module 136. The DBS transmitter module 136 generates the IDR signal at an IDR signal generator 140 every IDR period or repetition time ("IRT") to all TRX's in its coverage area via a multiple access ("MA") module 144 using MA scheme such as CDMA or UWB-MA, and a modulator 148. FIG. 3 shows a typical timing sequence 300 during a transmission of a IDR signal 302 and reception of an uplink signal 303 from the TRX 108. The IDR signal 302 generally has a signal duration of $\tau_{DBS}$ 304, and a period of IRT 308. Between transmissions of the IDR signals 302, the DBS transmitter 136 generally remains idle while a receiver module 156 of the DBS 104 (FIG. 1) waits for a response from any TRX of duration of $\tau_{TRX}$ 312. A large IRT 308 generally reduces interference effects at the TRX transceiver module 116 due to a presence of other IDR signals 302 transmitted by other DBS's. The modulated IDR signals or the downlink signal 302 is transmitted via at an omni-directional or directional antenna 112 depending on application.

If an intended TRX 108 is inside the coverage area, the TRX 108 will respond with a unique ID or an uplink signal via its directional or omni-directional antenna 120. The uplink signal 303 generally has a duration of $\tau_{TRX}$ that is substantially shorter than the time period between IDR signals—the IRT 308. When the uplink signal 303 is received at a directional antenna array 152, position of each TRX is tracked by the DBS 104 separately. More particularly, a receiver module 156 receives the uplink signal 303 at an MA receiver 160, a diversity combiner 164, an adaptive beamfinder 168, and an angle of arrival ("AOA") finder 172. The operation of the receiver module 156 is detailed hereinafter. The DBS 104 also includes a processor 176 to decode the uplink signal and locate the TRX 108. For collision avoidance applications, the processor 176 also provides a warning signal and controls vehicle brakes when required.

Figure 4:
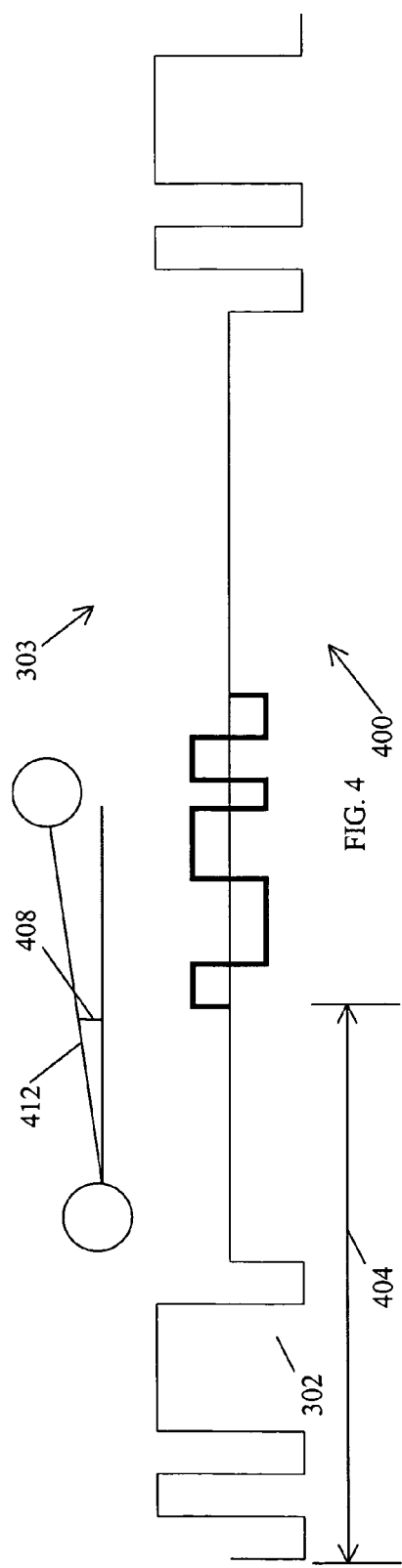
FIG. 4 shows a dynamic base station communicating with a mobile.

FIG. 4 shows a general view 400 of how the WLPS 100 finds a TRX position. In general, two factors are used in determining the TRX position, namely, a time of arrival ("TOA") 404, and direction of arrival ("DOA") or AOA 408. Once the uplink signal 303 has been received at the MA receiver 60, the DBS receiver module 156 estimates a round-trip time, and thus determines a distance 412 between the TRX 108 and the DBS 104. For example, the distance between the TRX 108 and the DBS 104 can be established by the TOA 404 of the uplink signal 303 with reference to a starting time of the IDR signal 302. The DOA 408 is determined via the antenna array 152 at the DBS. Specifically, the antenna array 152 uses an AOA detection mechanism. The antenna array 152 also uses a spatial division multiple access ("SDMA") scheme to assist in reducing interference effects.

Interference effects arise when a plurality of DBS's 104 or a plurality of TRX's 108 are used in the WLPS 100. The interference effects in the WLPS 100 are mainly due to a probability-of-overlap ("$P_{ovl}$") of signals received from the DBS 104 at the TRX transceiver 116, or signals received from the TRX 108 at the DBS receiver module 156. Also, other issue includes range ambiguity at the DBS 104 due to signals transmitted by one TRX 108 in response to IDR signals 302 received from a plurality of DBS's 104. Details of these signal effects are described hereinafter.

In a case where more than one DBS 104 may transmit IDR signals 302 in a specific coverage area, the TRX transceiver 124 is subject to an inter-DBS interference ("IBI"). Selecting a large IRT and using different MA schemes such as direct sequence CDMA ("DS-CDMA") mitigate the IBI effect at the TRX transceiver 124. Particularly, selecting a large IRT will generally reduce the probability-of-overlap of the received signals from different DBS's at the TRX 108, thus enhance a probability-of-detection ("POD") of the received signals.

Figure 5:
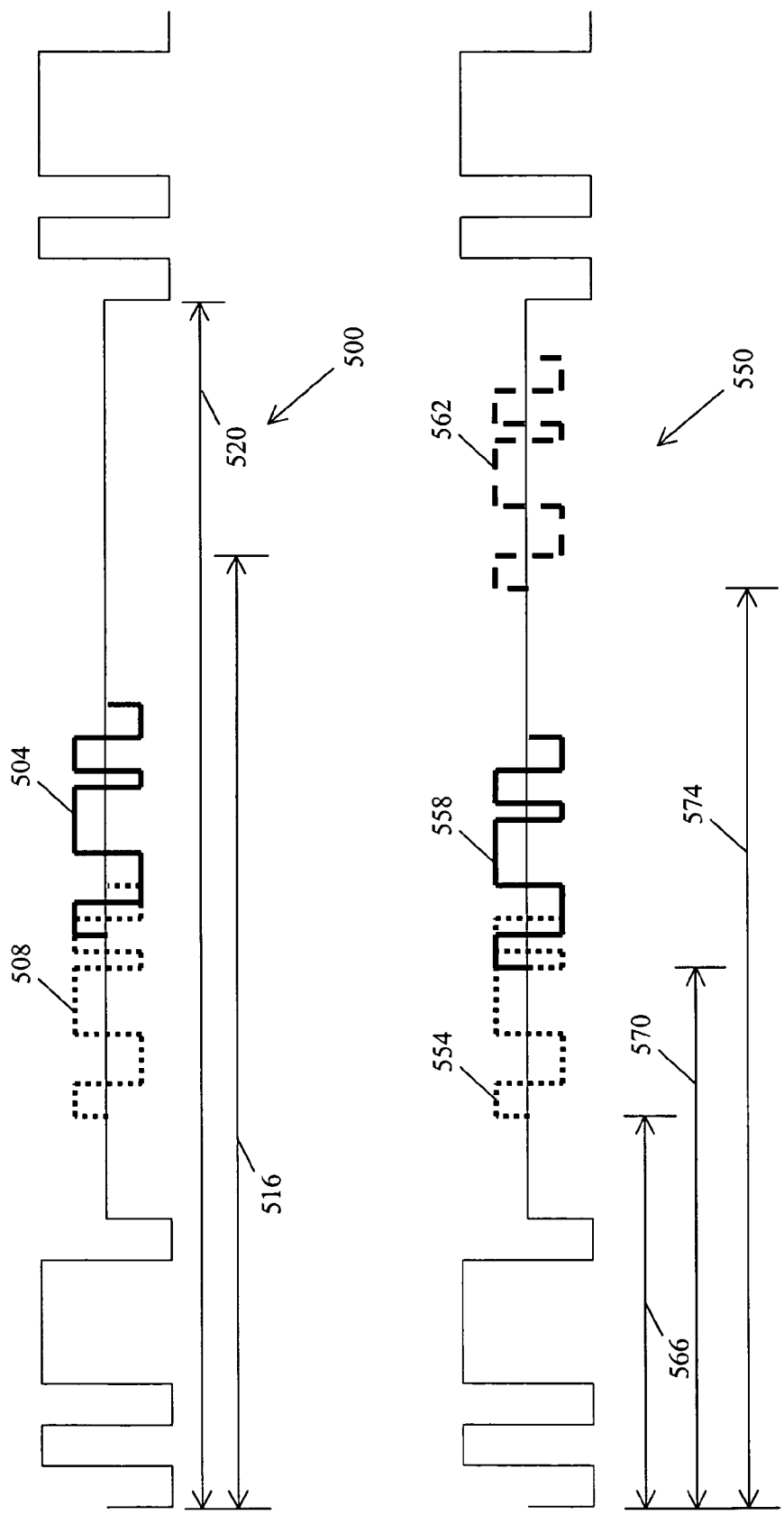
FIG. 5 illustrates timing diagrams of signals being received during an interference.

When a number of TRX's 108 in the WLPS coverage area respond to the IDR signal 302 from a DBS 104 simultaneously, an inter-TRX-interference ("IXI") effect at the DBS receiver 156 occurs. FIG. 5 shows two timing diagrams 500, 550 illustrating different types of IXI effects. The timing diagram 500 shows two overlapping ID signals 504, 508 from two TRX's in response to an IDR 512 from a DBS 104. Both ID signals 504, 508 are received within $IRT_{min}$ 516 that are independent of the selection of IRT 520. Unlike the IBI effects, selecting a large IRT 308 generally does not reduce the IXI effects since the responses from the TRX's 108, 504, 508 are received within a minimum IRT 504 determined by a maximum coverage range of the DBS 104 at all times. To reduce the IXI effects, MA techniques are used for TRX or ID signal transmissions, while directional antenna 152 and beamforming ("BF") techniques are used at the adaptive beamformer 168 of the DBS 104.

When the TRX 108 uses the same ID signal, or the same MA scheme for IDR's, a range ambiguity occurs. There are a few sources of range ambiguity at the DBS 104. For example, in a coverage area where more than one DBS is present, each TRX 108 located may generate ID in response to more than one DBS within an IRT. As a result, both the IXI effects and the range ambiguity occur. The timing diagram 550 of FIG. 5 shows three ID signals 554, 558, 562 from a TRX are received by three different DBS's in response to three different IDR's. Each of the ID signals 554, 558, 562 has a corresponding TOA, 566, 570, 574, respectively. The three TOA's 566, 570, 574 therefore form a unique range ($R_{554}$, $R_{558}$, $R_{562}$) which correspond to 566, 570, and 574, respectively. Like the IXI effects are reduced via the MA schemes and the BF techniques as discussed, the range ambiguity is reduced by different combinations of MA and IDR assignments for each DBS 104. In this way, a TRX 108 can distinguish a DBS 104 from another DBS 104' by a unique IDR.

For another example, if an ID signal or a response to an IDR signal 512 is not received by a DBS 104 within the IRT 520, distances between the DBS 104 and the TRX 108 can be improperly determined. As a result, a DBS 104 generally selects more than one minimum value for the IRT. The minimum value for the IRT is determined by a maximum coverage or a maximum range $R_{max}$. Considering the maximum uplink antenna array 152 with half power beam widths ("HPBW") β to be less than 90°, the IRT can be determined as follows, which defines a lower limit or a minimum for IRT:

$$IRT \geq IRT_{min} = 2T_{max} + T_d + T_G$$

where $T_{max}$ denotes a maximum possible time delay between a TRX transmission and a DBS reception, $T_d$ is a TRX time delay in responding to the IDR signal, and $T_G$ is a guard band time that corresponds to:

$$T_G = 5T_m + \tau_{DBS} + \tau_{TRX}$$

where $T_m$ is a channel delay spread, while $\tau_{DBS}$ and $\tau_{TRX}$ are durations of DBS and TRX transmission signals, respectively. Using simple geometry, $T_{max}$ is determined by $R_{max}$ and β via $$T_{max} = R_{max} \frac{(1 + \cos^{-1}\beta)}{2c}$$

where c is the speed of light. The maximum possible time delay of IRT is therefore a function of velocities of the moving TRX and DBS, and the required processing time which varies with applications. In general, the IRT is selected large enough to reduce IBI effects at the TRX receiver. However, a large value of IRT does not affect the IXI, since all of the signals are received by the DBS receiver within $T_{max}$, which is mainly a function of a maximum coverage range.

Figure 6:
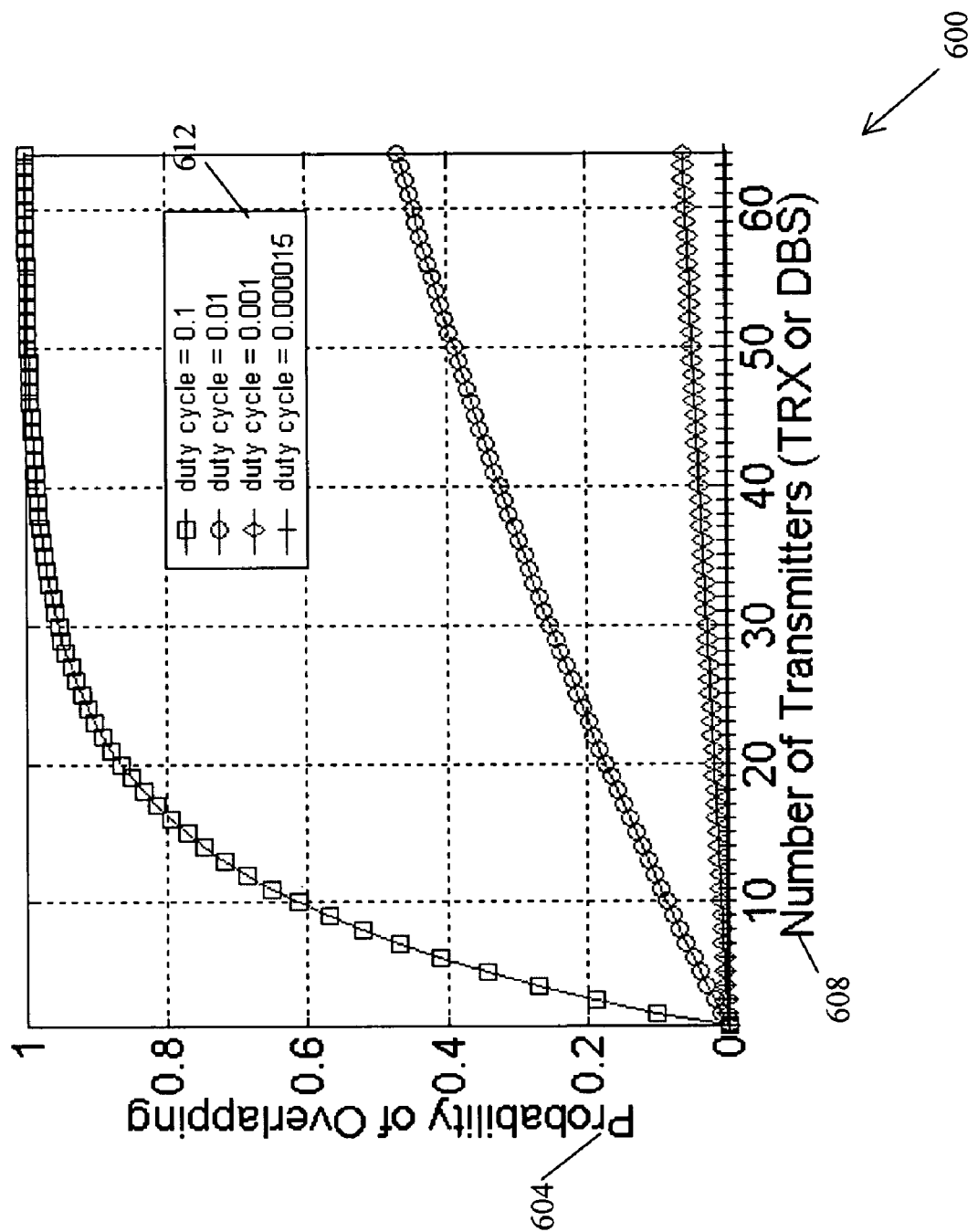
FIG. 6 shows a chart illustrating a probability of overlapping versus a number of transmitter.

The probability-of-overlap has a profound effect on the performance of any TRX or DBS receiver. In general, the probability-of-overlap is a function of the total number of DBS 104 and TRX 108 in the coverage area, and corresponds to $$P_{ovl} = 1 - (1 - d_c)^{K-1}$$

where $d_c$ is a duty cycle, and $d_c = \tau/T$, $\tau = \tau_{DBS}$ or $\tau_{TRX}$ is the duration of DBS (TRX) transmitted signal, and $T = T_{DBS}$ or $T = T_{TRX} = IRT$, and K is the total number of DBS and TRX in the coverage area. In such a case, $T_{DBS} = IRT_{min}$, as determined earlier. In other embodiments, $T_{DBS}$ can be selected based on design and applications. FIG. 6 shows a plurality of curves 600 depicting $p_{ovl}$ 604 as a function of the number of transmitters (TRX or DBS) 608 for different duty cycles 612. Specifically, as the duty cycle 612 gets smaller, the probability of overlapping decreases. In addition, similar to $d_c$ being a function of $\tau_{DBS}$ and $\tau_{TRX}$, performance of both $p_{ovl}$ and the POD of the WLPS 100 also depend on $\tau_{DBS}$ and $\tau_{TRX}$. As shown in FIG. 6, selecting a large enough $T_{TRX}$ thus reduces the IBI effects at the TRX transceiver 124.

In general, selecting values for $\tau_{DBS}$ or $\tau_{TRX}$ depends on a desired system capacity in terms of the number of TRX 108 and DBS 104 to be accommodated, a system bandwidth and maximum coverage, and applications of the WLPS 100. In general, both $\tau_{DBS}$ and $\tau_{TRX}$ are smaller than the IRT to reduce the probability-of-overlapping among signals received by the receivers 124, 156 of TRX 108 and DBS 104, respectively. A small $P_{ovl}$ generally decreases both the IBI at the TRX, and the IXI effects at the DBS 108, thereby improves the POD, a positioning accuracy, and a system capacity of the WLPS 100. On the other hand, the system capacity expressed by a maximum number of TRX 108 or DBS 104 determines the number of bits used in each ID code to be transmitted over a period of $\tau_{DBS}$ or $\tau_{TRX}$. For a given system capacity, a WLPS bandwidth required for the ID code transmission is inversely proportional to $\tau_{DBS}$ or $\tau_{TRX}$ A large IRT therefore allows a large $\tau_{DBS}$ when compared to $\tau_{TRX}$, without sacrificing $P_{ovl}$ at the TRX transceiver 124. Hence, the WLPS bandwidth is mainly determined by the value of $\tau_{TRX}$.

As discussed earlier, the IXI or IBI effects at the DBS receiver 156 or at the TRX transceiver 124 can be mitigated via selecting a large $d_c$, and selecting different MA schemes. Furthermore, a large IRT reduces the $d_c$ and consequently the IBI effects at the TRX transceiver 124, while a large IRT does not reduce the IXI effects at the DBS receiver. Hence, while a transceiver 124 or 156 may result in a high TRX POD performance, performance of the DBS 104 is improved via a combination of MA schemes such as DS-CDMA and SDMA.

In one embodiment, the WLPS 100 includes standard transceivers 136 and 156, 116 at the DBS 104 and at the TRX 108, respectively. The transmitted signals from the DBS 104 and the TRX 108 are dependent on factors such as a maximum allowable number of bits per ID, and an actual number of bits used in an ID. If a frequency selective channel is used, the uplink or the ID signals received at the DBS 104 are a mixture of signals from different users and different paths. The mixture of signals can be a combination of a total number of users, a number of paths for the users, a channel fading effect including long-term fading and short term fading, time delay, and a random phase for the user's path, among other things.

Figure 7:
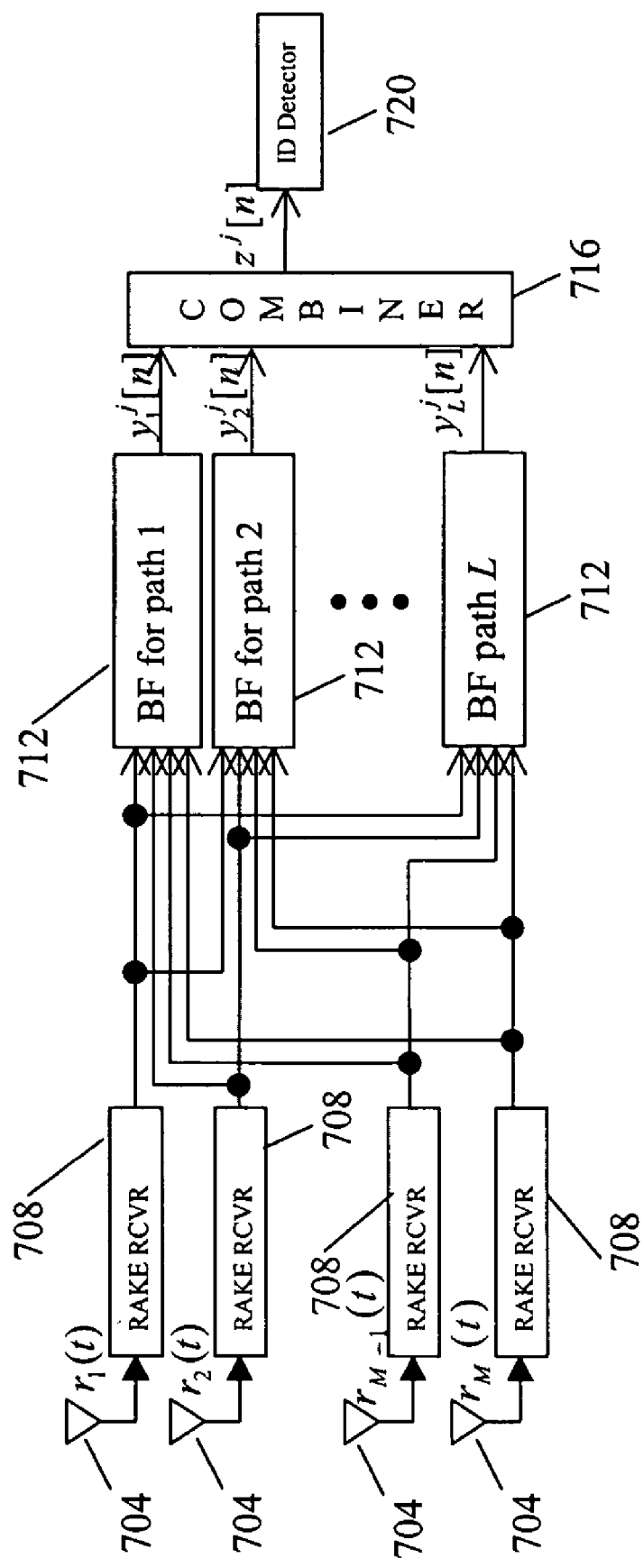
FIG. 7 shows a beamformer embodying the invention.

As discussed earlier, BF techniques reduce the interference signal from other users and other paths. FIG. 7 shows an exemplary WLPS 700 with a frequency selective channel. The WLPS 700 includes a plurality of antennas 704, and a plurality of rake receivers 708 coupled to a plurality of beamforming paths 712. The signals are first detected by the antennas 704, the detected wireless signals are fed through the rake receivers 708 for processing. Outputs of the rake receivers are then fed to the beamforming paths 712. Outputs of the beamforming paths are thereafter combined at a combiner 716, and fed to an ID detector 720.

Exemplary applications of the WLPS 100 are illustrated as follows.

In one embodiment, the WLPS 100 is applied to a multi-robot cooperation system. In the application, both the DBS 104 and the TRX 108 are mounted on all robots. Multi-robot structures have important applications in space applications, safety systems, and defense technology. In another embodiment, the WLPS 100 includes a collision avoidance system 10. In the collision avoidance system 10, both the TRX 108 and the DBS 104 are mounted on all vehicles to prevent vehicle-to-vehicle collision, while pedestrians are required to equipped with a TRX 108.

In yet another embodiment, the WLPS 100 includes an airport security system. In the airport security system, security personnel are equipped with both the DBS 104 and the TRX 108, while other people are required to being equipped with the TRX 108 only. In this way, security personnel will be capable of locating all people in an airport environment. In the application, the DBS 104 may be installed in some positions in hallways, for example, to enhance the coverage area beyond the LOS. This is an example of an application in which the DBS 104 is stationary. In addition, multi-hop localization techniques can also be used to extend the coverage area of the DBS 104. In some cases such as indoor applications, UWB-MA systems can be configured to accurately estimate the DOA and the TOA.

In yet another embodiment, the WLPS 100 includes a defense system. The defense system includes a central controller that is equipped with the DBS 104, whereas a commander chains are equipped with both the DBS 104 and the TRX 108, and soldiers are equipped with the TRX 108.

In yet another embodiment, the WLPS 100 is used for law enforcement issues. For example, police vehicles can be equipped with a DBS 104, with a capability of reading the contents of ID codes of each vehicle includes the vehicle make, ownership information, and the like.

Besides vehicle-to-vehicle and vehicle-to-pedestrian collision avoidance, the WLPS 100 has other commercial embodiments. For example, the WLPS 100 can be implemented as a driving aid, monitoring aid, and vehicle office. As a navigational system, the WLPS 100 can help drivers to drive safely and avoid heavy traffic. As a monitoring system, the WLPS 100 is able to collect information instantaneously for emergency help and security controlling.

Specifically, the WLPS 100 can be implemented as a lane-merging-danger-predictor. In either highway or urban streets, most collision accidents happen when driver switches lanes without checking a blind spot behind the driver. The WLPS 100 installed on a vehicle allows the driver to be notified for example with a beep, if there is a vehicle behind the driver closely, the driver will not switch lanes. In this application, directional antennas 112 are used with the DBS 104 transmitter 136 for specific coverage areas.

Another application of the WLPS 100 is automatic traffic sign notification. In urban area, the TRX can be installed on stop signs, street sign, one way street sign, yield sign, gas station, and the like, the driver can be alerted of the signs ahead automatically, for example, by voice and/or text.

Also, on interstate highways, the TRX 108 can be installed on exit signs. In this way, the driver will not have to miss a particular exit. The driver can even set a vehicle destination exit, and the driver will be notified when the destination exit is near. Furthermore, installing the TRX 108 on the retro-reflective pavement markers used to guide drivers on highway, an auto-pilot system can drive the vehicle via these guiding signals.

In addition to the driving aid, the WLPS 100 can also be employed in heavy traffic controls. For example, a parking lot of a stadium can install a unique TRX 108. When the lot is full, the TRX 108 will transmit a "full" signal, and the drivers will be notified. In general, the application of WLPS 100 in driving is to "PUSH" the information to drivers, and then the driver does not need to "PULL" the information by the operator.

As for administration, the WLPS 100 can be used as an alternative ID of a vehicle. The transmitted signal of a TRX 108 on the vehicle can include the vehicle's maker, year, color, VIN, plate number, owner's name, and the like. Therefore, a TRX can be used as an ID of the vehicle. The transmitted ID is generally encrypted to ensure privacy. Considering that access time to each ID is quite short, it is very time consuming to decrypt the ID via brutal decoding. Only authorized people such as police cars may have privileges to read the contents of the ID. All vehicle information including position, speeds and brief information, are shown in a small screen. When accidents happen, a policeman and an ambulance can retrieve the vehicle's information and location before arriving.

Furthermore, the WLPS 100 can also be applied to automatic toll payment. In cities where vehicles have to stop by some toll booths to pay tolls which slows down the traffic considerably in many cases. With the WLPS 100, the vehicles bypass these stations, and a charging process is taken automatically when they pass through. In this way, the drivers do not need to carry any coin or cash, the stations save their human-power cost, and the traffic becomes smooth. In this example, the toll booth acts as a stationary DBS.

The WLPS 100 can be considered as an add-on to a vehicle. For example, the WLPS 100 is a part of a vehicle. The WLPS 100 will co-operate with a vehicle self-diagnostic system, a GPS system, a mobile communication system, an auto-pilot system, and the like. Also, considering each vehicle as a node of a wireless sensor network, the vehicles can exchange their information. By implementing the WLPS 100, the drivers are able to use their vehicle as an office. The police can monitor the traffic, trace the stolen car, locate an accident, stop a heavily damaged car, etc. In general, the WLPS 100 helps the information exchange between drivers, polices and the road utilities in the future vehicles.

In one embodiment, the WLPS system includes a plurality of TRX's, a multi-path environment. The ID code has six bits, the DS-CDMA code has 64 chips, the channel delay spread for a typical street area is 27 ηsec, and the carrier frequency is 3 GHz, $\tau_{DBS}$ is 24 μsec, $\tau_{TRX}$ is 1.2 μsec. Other features include a maximum coverage range of 1000 m, the antenna array being linear with four elements with antenna element separation of 0.05 m and HPBW being 27°, and four multi-paths leading to four fold path diversity. Furthermore, the TRX distance is uniformly distributed in [0 1] km, the TRX angle is uniformly distributed in [0 π], the TRX TOA is uniformly distributed in [0 $T_{max}$] with $T_{max}$ being 3.3 μsec, a uniform multi-path intensity profile, i.e., bit energy is distributed in each path identically, binary phase shift keying ("BPSK") modulation, and perfect power control and TOA estimation. Based on the setup, the minimum IRT, $IRT_{min}$ is 9.83 μsec. A value of IRT=24 msec is also selected to reduce the IBI effects. With the $\tau_{DBS}$ and $\tau_{TRX}$, the bandwidth of a DS-CDMA (standard) transmitter is 320 MHz (5 MHz) for the TRX, 16 MHz (250 KHz) for the DBS, which is much smaller than the TRX bandwidth. Hence, the WLPS bandwidth is mainly determined by the TRX transmission bandwidth, as expected. In addition, using these parameters, the duty cycle for the DBS and the TRX receivers correspond to $d_{cDBS}$=0.1 and $d_{cTRX}$=0.001. In some cases, the WLPS 100 has a bandwidth between about 2 GHz and 3 GHz, or between 100 MHz and 10 GHz depending on application.

As discussed earlier, the IBI effects at the TRX receiver can be considerably reduced by selecting a large IRT. However, the selection will not affect the IXI effects at the DBS receiver 156. Hence, a TRX transceiver module 116 can be implemented by the transceiver 124, or by using a DS-CDMA scheme without BF. The DBS receiver 156, however, needs a combination of DS-CDMA and BF. A small $d_{c,TRX}$=0.001 at the TRX transceiver 124 leads to a small $p_{ovl}$, which leads to small IBI effects and high POD. In contrast, a large $d_{c,DBS}$ being about 0.1 at the DBS receiver leads to a high $p_{ovl}$ that results in high IXI effects. Both BF and CDMA techniques help to reduce the IXI effects at the DBS.

Figure 8A:
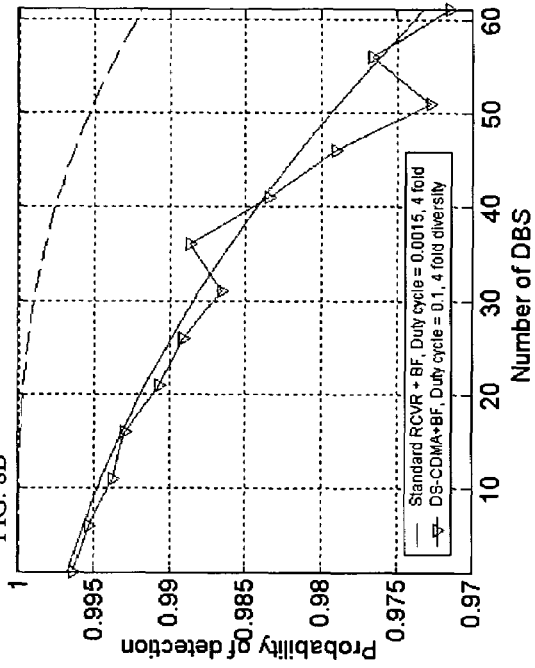
FIG. 8A shows a chart illustrating a probability of detection versus a number of mobiles.

The probability of detection of the DBS receiver is shown in FIG. 8A which shows the POD versus a number of TRX's for a standard transceiver 124 and a DS-CDMA transceiver 132, without antenna arrays 152 and BF 168. FIG. 8A also shows that in general the POD decreases as the number of TRX's increases, which is a direct result of the IXI effects. As to the impact of BF, the use of BF does not affect much the capacity in terms of number of TRX's for a standard receiver, but it considerably enhances the capacity of the DS-CDMA system. Merging DS-CDMA with BF thus enhances the POD performance of the WLPS system.

Figure 8B:
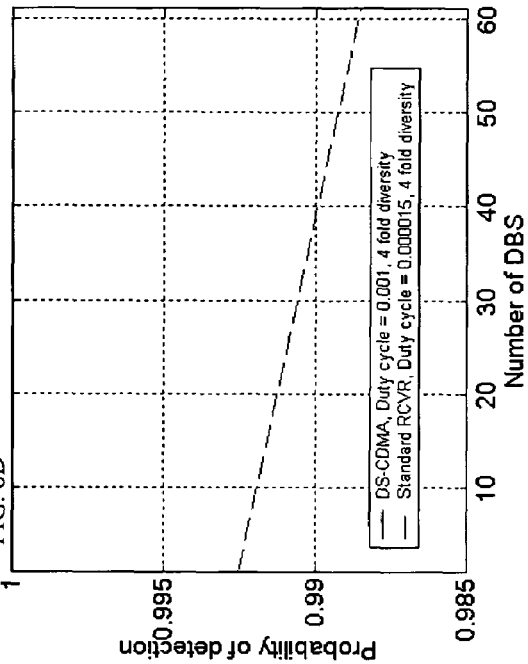
FIG. 8B shows a chart illustrating a probability of detection versus a number of bases.

The POD results for a TRX transceiver 124 using a standard receiver is shown in FIG. 8B which shows that a standard TRX receiver achieves good POD performance, although the POD performance can be improved if a larger IRT value, or a smaller $\tau_{DBS}$ value is used. For example, occupying the same bandwidth as DS-CDMA, a standard receiver has $\tau_{DBS}$ or $\tau_{TRX}$ to be ¹⁄₆₄th of that of a DS-CDMA system. In such a case, the same number of path diversity as the DS-CDMA receiver, that is, four fold diversity, can be achieved. In some cases, the system has a bandwidth between about 2 GHz and 3 GHz, or between 100 MHz and 10 GHz.

Figure 8C:
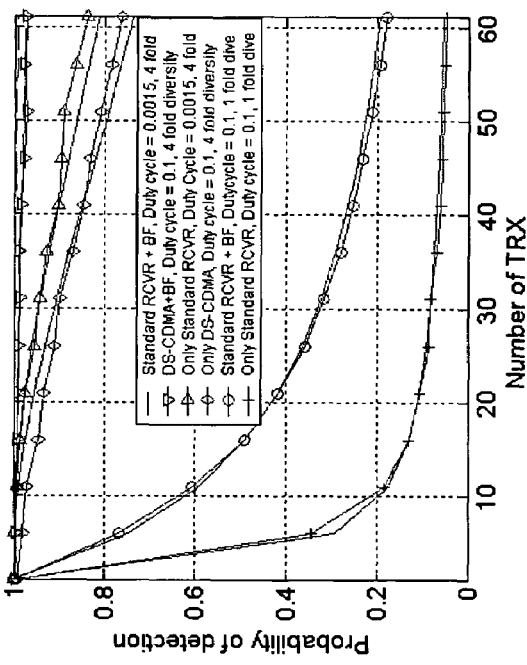
FIG. 8C shows a magnified chart illustrating a probability of detection versus a number of mobiles of FIG. 8A.
Figure 8D:
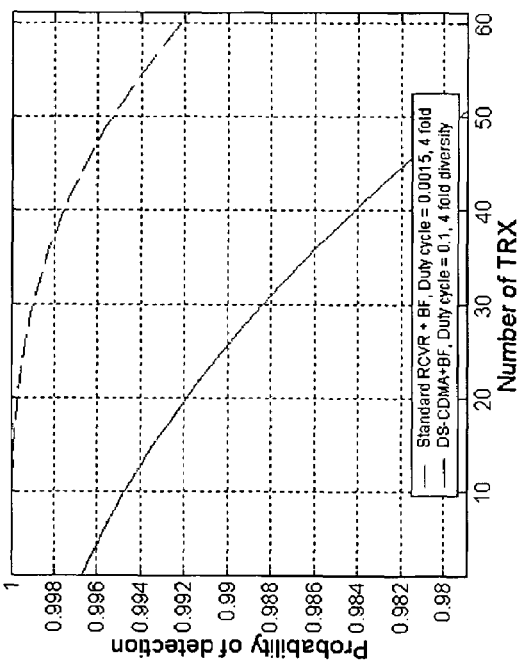
FIG. 8D shows a magnified chart illustrating a probability of detection versus a number of bases of FIG. 8B.

FIG. 8B shows that, with similar bandwidths, a DS-CDMA system with duty cycle 64 times higher than a standard receiver leads to almost a same performance curve. The top two curves in FIG. 8A for standard and DS-CDMA receivers with BF are magnified in FIG. 8C. FIG. 8C shows that standard receiver outperforms DS-CDMA receiver for DS-CDMA with high duty cycles. In this case, the standard receiver leads to a capacity more than two times of DS-CDMA receiver at the POD=0.99. For the TRX transceiver 124, $p_{ovl}$ statistics with $d_c$ about 0.000015 is depicted. The low probability leads to the high TRX standard receiver POD performance shown in FIG. 8B. However, FIG. 8B also shows that DS-CDMA receiver outperforms standard receiver for DS-CDMA with low duty cycles. For airport security where the data rate is not critical, the IRT can be chosen larger than 24 msec for even better TRX standard receiver POD performance.

Various features and advantages of the invention are set forth in the following claims.

The invention claimed is:

1. A method of locating an immobile target fixedly positioned at a location via a mobile base, the method comprising:
    transmitting a first wireless signal from the mobile base at a first time;
    receiving the first wireless signal at the immobile target fixedly positioned at the location;
    transmitting a second wireless signal from the immobile target in response to receiving the first wireless signal;
    receiving the second wireless signal at the mobile base at a second time;
    determining a time difference between the first time and the second time;
    determining an angle of arrival of the second wireless signal; and
    locating the immobile target based on the angle of arrival and the time difference.

2. The method of claim I, wherein transmitting the first wireless signal comprises:
    generating an identification request; and
    modulating the identification request with a multiple access scheme.

3. The method of claim 2, wherein the multiple access scheme comprises at least one of a code-division multiple access ("CDMA") scheme, a direct sequence CD MA ("DS-CDMA"), a synchronous CDMA ("SCOMA"), and an ultra-wide band multiple access ("UWB-MA").

4. The method of claim 1, wherein transmitting the first wireless signal comprises providing a carrier frequency between about 2 GHz and about 3 GHz.

5. The method of claim 1, wherein receiving the second wireless signal comprises receiving the second wireless signal at least one of an antenna array and a rake receiver array.

6. The method of claim 1, wherein transmitting the first wireless signal comprises transmitting the first wireless signal using at least one of a long term fading technique, and short term fading technique.

7. The method of claim 1, further comprising providing a communication bandwidth between about 10 MHz and about 10 GHz.

8. The method of claim 1, further comprising beamforming the second wireless signal.

9. The method of claim 1, wherein transmitting the first wireless signal comprises omni-directionally transmitting the first wireless signal.

10. The method of claim 1, wherein determining a time difference comprises determining a velocity of the mobile base.

11. A method of locating an immobile target fixedly positioned at a location from a mobile base, wherein the mobile base has an omni-directional means for transmitting a base wireless signal, and an antenna array means for receiving a target signal and capable of determining a reception angle of the target signal, and the target at the fixed location has a transponding means capable of receiving an activating signal and responding with a target signal, the method comprising:
    omni-directionally transmitting the activating signal from the omni-directional means at a first time while moving the mobile base;
    activating the transponding means at the immobile target fixedly positioned at the location in response to receiving the activating signal;
    transmitting a wireless target signal from the transponding means after the transponding means has been activated;
    receiving the target signal at the antenna array means at a second time;
    determining from the antenna array means the reception angle of the target signal;
    comparing the first time with the second time to obtain a signal travel time; and
    locating the immobile target based on the signal travel time and the reception angle of the target signal.

12. The method of claim 11, wherein transmitting the activating signal comprises:
    generating an identification request; and
    modulating the identification request with a multiple access scheme.

13. The method of claim 12, wherein the multiple access scheme comprises at least one of a code-division multiple access ("CDMA") scheme, a direct sequence CDMA ("DS-CDMA"), a synchronous CDMA ("CDMA"), and an ultra-wide band multiple access ("UWB-MA").

14. The method of claim 13, wherein transmitting the activating signal comprises providing a carrier frequency between about 2 and about 3 GHz.

15. The method of claim 11, wherein receiving the target wireless signal comprises receiving the target wireless signal at a rake receiver array.

16. The method of claim 11, wherein transmitting the activating signal comprises transmitting the activating signal using at least one of a long term fading technique, and short term fading technique.

17. The method of claim 11, further comprising providing a communication bandwidth between about 10 MHz and 10 GHz.

18. The method of claim 11, further comprising beamforming the target wireless signal.

19. A method of locating a selected one of a plurality of immobile targets fixedly positioned at respective locations from a mobile base, the method comprising:
    transmitting a wireless activating signal from the mobile base at a first time;
    activating with the wireless activating signal a transponder on each of the plurality of immobile targets at their respective fixed locations;
    in response to activating each transponder, transmitting with each transponder at its fixed location a wireless signal having a unique mobile signature;
    receiving the wireless signals at the mobile base at a plurality of arrival times;
    comparing the unique mobile signature of each wireless signal with a known unique mobile signature of the selected immobile target;
    identifying the wireless signal of the selected immobile target based upon a match between the known unique mobile signal and the unique mobile signal of one of the wireless signals;
    determining a reception angle of the wireless signal of the selected immobile target;
    comparing the first time with the arrival time of the wireless signal of the selected immobile target to obtain a time difference; and
    locating the selected immobile target based on the time difference and the reception angle.

20. The method of claim 19, wherein transmitting the wireless activating signal comprises:
    generating an identification request; and
    modulating the identification request with a multiple access scheme.

21. The method of claim 20, wherein the multiple access scheme comprises at least one of a code-division multiple access ("CDMA") scheme, a direct sequence CDMA ("DS-CDMA"), a synchronous CDMA ("SCDMA"), and an ultra-wide band multiple access ("UWB-MA").

22. The method of claim 19, wherein transmitting the wireless activating signal comprises providing a carrier frequency between about 2 GHz and about 3 GHz.

23. The method of claim 19, wherein receiving the mobile wireless signal comprises receiving the mobile wireless signal at a rake receiver array.

24. The method of claim 19, wherein transmitting the wireless activating signal comprises transmitting the wireless activating signal using at least one of a long term fading technique, and short term fading technique.

25. The method of claim 19, further comprising providing a communication bandwidth between about 10 MHz and 10 GHz.

26. The method of claim 19, further comprising beamforming the mobile wireless signal.

* * * * *